3,651,216
ANTIBIOTIC SUBSTANCES PRODUCED BY POLYANGIUM CELLULOSUM VAR. FULVUM

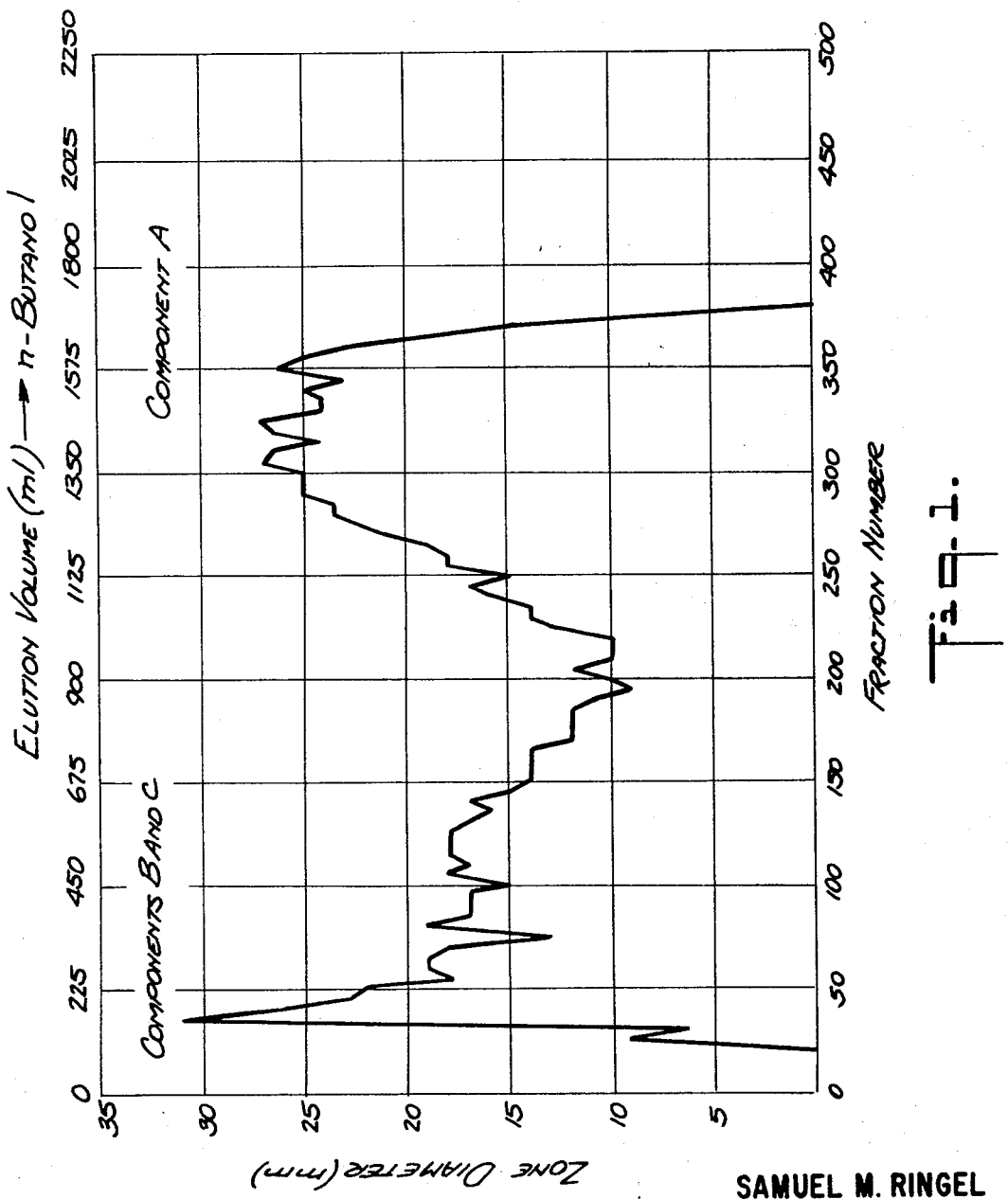

Samuel Morris Ringel, Rockaway, Sidney Roemer, Parsippany, and Ann Lee Gutt, Passaic, N.J., and John E. Peterson, Columbia, Mo., assignors to Warner-Lambert Company, Morris Plains, N.J.
Filed May 11, 1970, Ser. No. 36,158
Int. Cl. A61k 21/00
U.S. Cl. 424—115                                  7 Claims

ABSTRACT OF THE DISCLOSURE

The present invention discloses new antibiotics produced by the organism *Polyangium cellulosum* var. *fulvum*, Mishustin, 1938 (SMP–78). These antibiotics, designated as A, B and C, are effective against a variety of fungi, for example, *H. capsulatum*, *T. mentagrophytes*, etc.

---

The present invention relates to new antibiotics particularly effective against pathogenic fungi. The present invention also includes within its scope novel processes for the production of these antibiotics, designated as being A, B and C, produced by the organism *Polyangium cellulosum* var. *fulvum* (SMP–78).

DESCRIPTION OF ORGANISM

The original source of the organism *Polyangium cellulosum* var. *fulvum*, designated as isolate SMP–78, was collected from Callaway County, Mo.

This organism grows well on filter paper, overlaying an inorganic salt agar from which streams of slime and cells radiate out over the surface of the agar producing a bright orange, homogeneously-pigmented colony. It also grows well on agar containing cellobiose (or soluble starch) as the carbon source, forming deep, rounded craters in the agar, and in liquid media containing cellobiose (maltose, dextrin or soluble starch), in which it produces irregular pellets of cells and slime. It does not grow in nutrient broth or in thioglycollate broth. This organism possesses typical Sorangium-type cells, which are comparatively short and rigid with blunt, rounded ends. They average 1.0–1.5 x 4.0–5.0$\mu$; however, the size, particularly the length, can be quite variable. After purification, this organism no longer produces true fruiting bodies.

DEPOSIT

This organism designated as *Polyangium cellulosum* var. *fulvum* is deposited at the American Type Culture Collection, identified as ATCC #25532, and is available to the public without restriction. This culture will be maintained throughout the life of this patent.

CONDITIONS FOR ANTIBIOTIC PRODUCTION

This organism will grow to produce the desired antibiotic substances either under surface conditions or under submerged aerobic conditions. The manner of achieving growth under either of these conditions is well known to the art. The optimum antibiotic production of this organism is obtained when it is grown under submerged aerobic conditions while accompanied by aeration and agitation. For antibiotic production in flask culture, a rotary shaker set at a 2-inch stroke at 150 r.p.m. is superior to a setting at one inch stroke at 250 r.p.m. The time required for maximum yield of antibiotic varies with the method of cultivation and the amount of inoculum used. Under submerged aerobic conditions at 28° C., the maximum yield is obtained in from 8 to 10 days when a 2% standardized inoculum (v./v.) is used. Increasing the level of inoculum to about 30% (v./v.) and/or increasing the temperature to about 37° C. results in reducing the incubation time and increasing the antibiotic production. For example, a 30% standardized inoculum (v./v.) produces a maximum fermentation yield of antibiotic in approximately 3 to 5 days at a temperature of about 32° C.

Various liquid nutrient media containing sources of assimilable carbon and nitrogen which are commercially available can be advantageously employed to support the growth of this organism and to give good yields of the antibiotics. Exemplary of the assimilable carbon sources are cellobiose, maltose, dextrin, or soluble starch. While these assimilable carbon sources are preferred, other assimilable carbon sources traditionally used in nutrient media, for example, dextrose or fructose, can also be used. Assimilable nitrogen sources are, for example, those containing $NH_4+$, typically ammonium nitrate, ammonium sulfate, ammonium chloride, ammonium acetate, ammonium carbonate, diammonium phosphate and the like, or other organic nitrogen sources such as pancreatic digest of casein. However, ammonium nitrate is the usual source of nitrogen for antibiotic production. The media should preferably include sources of inorganic salts, for example, the inorganic salts of potassium, magnesium, calcium, iron and manganese; typically, dibasic potassium phosphate, calcium chloride, magnesium sulfate, ferric sulfate, manganese sulfate and the like.

BIO-POTENCY ASSAY

A cylinder-plate agar diffusion method is used to assay the fermentation broths for antibiotic production or to assay the partially purified antibiotic substances following recovery and extraction procedures. Sabouraud dextrose agar is the assay medium, with 20 ml. used as the base layer and 4 ml. containing a fungal spore suspension of *Microsporum canis* (01) as the seed layer. Plates are incubated at 37° C. for 36 to 40 hours or until sharp zones are obtained. A given preparation has been assigned as a reference standard based upon reproducible dose response-curves obtained over several assays. This assay method is described in Analytical Microbiology, edited by Frederick Kavanagh, Academic Press, 1963.

FLASK-CULTURE PRODUCTION (1) *Polyangium cellulosum* var. *fulvum* (SMP–78) is maintained on the following medium:

0.5% soluble starch
0.25% pancreatic digest of casein (Bacto-Casitone, Difco)
0.05% $MgSO_4.7H_2O$
0.025% $K_2HPO_4$
1.5% agar in de-ionized water. Adequate growth is obtained in about 7 days at 28° C.

(2) Sterile distilled water is added to an agar slant culture derived from (1) above; the surface is gently rubbed with a sterile pipette and the cell suspension is transferred to a sterile flask containing 3 mm. sterile glass beads. This mixture is agitated to afford a fine cell dispersion which is then swab-streaked onto agar plates containing the medium described in (1), and incubated at 28° C. for about 7 days.

(3) A medium is prepared in de-ionized water or solvent having the following composition:

0.3% maltose
0.1% $NH_4NO_3$
0.1% $K_2HPO_4$
0.02% $MgSO_4$
0.01% $NaHCO_3$
0.01% $CaCl_2$ 0.002% FeCl$_3$
0.00025% disodium ethylenediaminetetraacetate
0.001% ZnSO$_4$.7H$_2$O
0.0005% FeSO$_4$.7H$_2$O
0.00015% MnSO$_4$.H$_2$O
0.000039% CuSO$_4$.5H$_2$O
0.000025% Co(NO$_3$)$_2$.6H$_2$O
0.000018% Na$_2$B$_4$O$_7$.10H$_2$O Four hundred ml. aliquots of the medium are placed in 2-liter Erlenmeyer flasks. The flasks are then plugged with cotton and sterilized by autoclaving at 15 lb. pressure (121° C.) for 15 minutes; the pH after autoclaving is approximately 7.3. Each cooled flask is inoculated with a 4 ml. cell suspension of Polyangium cellulosum var. fulvum (SMP–78), obtained from (2) and adjusted so that a 1:10 dlution in sterile distilled water yields 60% light transmission (L.T.) using a spectrophotometer at 630 mµ. The inoculated flasks are incubated on a rotary shaker (2 inch stroke at 150 r.p.m.) at 32±1° C. for 5 to 7 days, at which time the pH is approximately 6.1.

SUBMERGED-CULTURE PRODUCTION (1) The organism Polyangium cellulosum var. fulvum (SMP–78) is maintained on a medium containing the following ingredients.

0.5% soluble starch
0.25% pancreatic digest of casein (Bacto-Casitone, Difco)
0.05% MgSO$_4$.7H$_2$O
0.025% K$_2$HPO$_4$
1.5% agar in de-ionized water. Adequate growth is obtained in about 7 days at 28° C.

(2) Sterile distilled water is added to an agar slant culture derived from the above procedure; the surface is gently rubbed with a sterile pipette and the cell suspension is transferred to a sterile flask containing 3 mm. sterile glass beads. The mixture is agitated to afford a fine cell dispersion which is then swab-streaked onto agar plates containing the medium described above, and incubated at 28° C. for about 7 days.

(3) The cell masses derived from the above procedure (2) are transferred to a sterile flask containing distilled water and 3 mm. sterile glass beads. This mixture is agitated to afford a fine cell dispersion and adjusted so that a 1:25 dilution in distilled water yields 25% light transmission (L.T.) at 630 mµ. Five ml. of this adjusted cell suspension are used to inoculate a 2-liter flask containing 500 ml. autoclaved medium having the following composition:

0.5% soluble starch
0.25% pancreatic digest of casein (Bacto-Casitone, Difco)
0.05% MgSO$_4$.7H$_2$O
0.025% K$_2$HPO$_4$ in de-ionized awter. This seed culture is incubated on a rotary shaker (two inch stroke at 150 r.p.m.) at 28° C. for 10 to 11 days or until the culture yields a 10% light transmission (L.T.) at 630 mµ. This culture is then inoculated into additional 2-liter flasks of the same medium (50 ml./ 500 ml. medium) and incubated under the same conditions. This is done to provide sizable quantities of seed culture.

(4) 300 ml. of seed culture are added to each 700 ml. of fermentation medium. The latter is prepared in deionized water having the following composition:

0.1%, NH$_4$NO$_3$
0.1% K$_2$HPO$_4$
0.02% MgSO$_4$
0.01% NaHCO$_3$
0.01% CaCl$_2$
0.002% FeCl$_3$
0.00025% disodium ethylenediaminetetraacetate
0.001% ZnSO$_4$.7H$_2$O
0.0005% FeSO$_4$.7H$_2$O
0.00015% MnSO$_4$.H$_2$O
0.000039% CuSO$_4$.5H$_2$O
0.000025% Co(NO$_3$)$_2$.6H$_2$O
0.000018% Na$_2$B$_4$O$_7$.10H$_2$O Prior to inoculation, these components are sterilized by autoclaving at 15 lb. pressure (121° C.) for one hour. An aqueous maltose solution (final concentration 0.3%) is separately sterilized by autoclaving at 15 lb. pressure (121° C.) for 15 minutes and is added to the above medium at the time of inoculation. The pH of the fermentation medium after autoclaving is approximately 7.3. Agitation is provided by means of impellers at 300 r.p.m. and aeration is provided at an airflow of 4 liters/minute during the fermentation period. The temperature during incubation is 32° C. and the fermentation time is about 3 to 5 days. The final pH at this time is approximately 6.1. Should the pH fall below 6.0 during the fermentation period, 1 N NaOH is used to readjust the pH back to 6.1. A 1:10 dilution of dimethylpolysiloxane, commercially available as Dow Corning Antifoam C is used as needed during the fermentation period. Other commercially available antifoaming agents can be used in place of dimethylpolysiloxane.

IN VITRO ACTIVITY OF THE ANTIBIOTICS

The antimicrobial spectrum is determined by the following procedure. The tests are determined with the fermentation filtrate obtained from Polyangium cellulosum var. fulvum (SMP–76). Trough depressions are made in Petri plates containing suitable agar media. An aqueous suspension of each test organism is streaked, by means of a cotton swab, in a single line at right angles to the edge of the trough. Wherever possible, spore suspensions are employed for testing fungal cultures. After streaking, the troughs are filled with the fermentation filtrate indicated above. Bacterial test plates are generally incubated for 24 hours at 37° C. and the fungal tests are held at either 25° or 37° C. for 48 hours or until adequate growth is visible along the streak line for differentiation of inhibition. The following medium is used for testing the fungal cultures: 10 grams phytone (BBL), 5 grams yeast extract, 20 grams dextrose, 20 grams agar, and sufficient water to make one liter. Trypticase soy agar is used for testing most of the bacteria.

The antibiotics are antifungal against a variety of organisms. The following fungi were inhibited to varying degrees by these antibiotics:

Histoplasma capsulatum, Trichophyton mentagrophytes, Trichophyton rubrum, Microsporum audouini, Microsporum canis, Microsporum gypseum, Epidermophyton flocossum, Hormodendrum pedrosoi, Aspergillus fumigatus, Candida parakrusei, Candida albicans, and Candida parapsilosis. Also inhibited were: Alternaria brassicola, Alternaria citri, Alternaria tenuis, Alternaria tomato, Alternaria sp., Aspergillus niger, Cephalosporium alvaradi, Cephalosporium longisporum, Cephalosporium sp., Cladosporium herbarum, Cuninghamella blakesleeana, Curvularia sp., Debaryomyces hansenii, Epicoccum sp., Fusarium moniliforme, Fursarium sp., Geotrichum candidum, Gibberella fujikuroi, Gliocladium deliquescens, Godronia cassandrae, Gymnoascus sp., Helminthosporium sativum, Hormodendrum sp., Macrophomina bataticola, Macrophomina phaseoli, Penicillium digitatum, Penicillium thomii, Penicillium sp., Pestalotia vaccinii, Phomopsis citri, Pichia alcoholophila, Rhizopus arrhizus, Rhizopus nigricans, Phizopus stolonifera, Scopulariopsis brevicaulis, Stemphylium botryosum, Stemphylium radicina, Trichoderma viridans, Ustilago maydis, Verticillium albo-atrum, and Verticillium sp.

The antibiotics are inactive against the following bacteria: Enterobacter aerogenes, Mycobacterium phlei, Proteus mirabilis, Proteus vulgaris, Pseudomonas aeruginosa, Staphylococcus aureus, and Streptococcus faccalis.

Further determination of the effect of these antibiotics is carried out by means of serial 2-fold dilutions in brain-heart infusion broth, employing standardized inocula of test organisms and a partially purified extract of the antibiotics. Representative results of these tests are given in the following table.

| Test organism | Sensitivity: mcg./ml. of antibiotics at 37° C. | | | |
|---|---|---|---|---|
| | 3 days | | 8 days | |
| | MIC [1] | MFC [2] | MIC | MFC |
| Histoplasma capsulatum yeast phase | 0.06 | 0.06 | 0.06 | 0.06 |
| Microsporum canis | 0.156 | 0.31 | 0.156 | 0.31 |
| Trichophyton mentogrophytes | 0.03 | 0.5 | 0.06 | 0.5 |

[1] Minimal inhibitory concentration.
[2] Minimal fungicidal concentration.

Accordingly, the antibiotics are very active against the yeast phase of Histoplasma capsulatum and are fungicidal. Similarly the antibiotics are strong fungicidal against the dermatophy Microsporum canis and are also active against Trichophyton mentogrophytes.

The antibiotics markedly inhibit the growth of Candida albicans at <0.37 mg./ml., whereas these partially purified antibiotics are inactive at 100 mg./ml. against the following bacteria: Staphylococcus aureus, Escherichia coli, Proteus vulgaris, Pseudomonas aeruginosa.

RECOVERY OF ANTIBIOTIC FROM THE CULTURE

The antibiotics, i.e., A, B, and C, are synthesized by the aforesaid organism and are extracted from the broth with ethyl acetate or a water immiscible alcohol solvent such as n-butanol. The extract is concentrated in vacuo at a temperature not exceeding 45° C. The concentrate is held at least 24 hours at 4° C. and clarified by sintered-glass filtration. This clarified concentrate contains at least 3 biologically active components distinguished as A, B, and C which may be further separated and purified by means of a commercial LH-20 Sephadex column with n-butanol as the collection solvent. LH-20 Sephadex is a commercially available crosslinked dextran where most of the hydroxyl groups have been alkylated (more specifically, see product brochure—which is attached hereto). The $R_f$'s for these components were determined by thin-layer chromatography. Thus, a silica gel such as Quantum Silica-Gel plates Type $Q_1$, spotted with aliquots from the Sephadex column was developed in 95% ethanol and revealed the following $R_f$'s upon biogramming: 0.86 (A), 0.19 (B), and 0.12 (C). Additional purification of each separated component is accomplished by means of counter-current distribution involving partitioning between n-butanol and water whereby the respective components are retained in the butanolic phase.

Antibiotic A was found to be a non-aromatic oxygen-containing antibiotic whereas B and C were found to be oxygen containing antibiotics. In addition, antibiotic A in a potassium bromide pellet shows an infrared characteristic having a peak of 1060 cm.$^{-1}$.

Aqueous solutions of the crude antibiotics A, B, and C are stable at pH 6.1–10.0 and show partial loss of activity at pH 5.5 and 4.0. These solutions are stable at 100° C. for 15 minutes and show partial loss of activity at 121° C. for 15 minutes.

Characterization of fermentation broths by bioautography using Microsporum canis (01) was made in part when the broths were spotted on:

Whatman #1 strips and developed with:
    $H_2O$ sat.-benzene
Silica Gel-Eastman Sheet 6060 and developed with:
    n-Butanol
    Ethyl acetate
    Ethyl acetate-butanol 9:1
    Methylene chloride Cellulose-Eastman Sheet 6055 and developed with:
    Ethyl acetate
    Ethyl acetate-butanol 9:1
    Methylene chloride because the microbiological activity remained at the origin.

By means of bioautography, fermentation broths were characterized by microbiological activity at the following $R_f$ when spotted on:

Whatman #1 strips and developed with:
    Water _____ 0.74
    $H_2O$ sat.-n-butanol _____ 0.93
    $H_2O$ sat.-ethyl acetate _____ 0.71
Cellulose-Eastman Sheet 6065 and developed with:
    Butanol _____ 0.23
    95% ethanol _____ 0.65
    n-Propanol-EtoAc-$H_2O$ 7:2:1 _____ 0.70

Further bioautographic work showed that the microbiologically active material consisted of more than a single entity as evidenced by the resolution of microbiological activity into 3 spots. This was carried out by spotting on Silica Gel-Eastman Sheet 6060 and developing with:

95% ethanol:
    at origin (antibiotic C)
    0.38 (antibiotic B)
    0.69 (antibiotic A)
n-Propanol-EtoAc-$H_2O$ 7:2:1:
    at origin (antibiotic C)
    0.28 (antibiotic B)
    0.50 (antibiotic A)

Further definitive characterization of the individual microbiologically active materials was accomplished by using a variety of thin-layer chromatography solvent systems on Silica Gel G plates (Mann or Analtech).

Antibiotic A had the following $R_f$ values with the corresponding developing solvent:

Methanol:ethanol 1:1 _____ 0.05
Water:methanol:ethanol 2:3:5 _____ 0.5
Water:ethanol 5:95 _____ 0.1
Methanol:ethyl acetate 1:1 _____ 0.02

Antibiotic B had the following $R_f$ values with the corresponding developing solvent:

Methanol:ethanol 1:1 _____ 0.3
Water:methanol:ethanol _____ 0.75
Water:ethanol 5:95 _____ 0.85
$NH_4OH$:water:i-propanol 5:15:85 _____ 0.57
Methanol:ethyl acetate 1:1 _____ 0.33

Antibiotic C had the following $R_f$ values with the corresponding developing solvent:

Methanol:ethanol 1:1 _____ 0.5
Water:methanol:ethanol 2:3:5 _____ 0.82
Water:ethanol 5:95 _____ 0.35
$NH_4OH$:water:i-propanol 5:15:85 _____ 0.61
Methanol:ethyl acetate 1:1 _____ 0.18
Water:ethanol 1:4 _____ 0.75

Although the $R_f$ values are characteristic for identification, it is of course understood that small variations do occur depending on the preparation of the particular plate, the exact method of spotting the material, the temperature, the distance of the solvent from the origin spot, and so on.

The active components can also be removed from fermentation broths by adsorbents such as carboxymethyl cellulose, florisil, carbon, and silica gel.

The following is an example illustrating the recovery of the antibiotics.

The whole broth from the submerged culture production as previously described, a clarified by means of a Buchner funnel using Whatman No. 1 filter paper. Three sequential extractions are made with ethyl acetate, each time using a ratio of 1 volume ethyl acetate:5 volumes broth. Each extraction is facilitated by means of mechanical stirring and recovery and the ethyl acetate layer after settling. The emulsion layer formed each time between the broth and solvent is removed and broken by means of 95% ethanol (1 vol. ethanol:5–10 vols. emulsion); the resultant ethyl acetate layer is added to the ethyl acetate extract. The pooled ethyl acetate extracts are reduced to 1/100 volume in vacuo at a temperature not exceeding 45° C.; held 24 hours at 4° C. and filtered through a sintered-glass funnel. From 90–100% of the antibiotics are recovered by this procedure, resulting in 200 fold purification.

Further purification is accomplished by reducing the ethyl acetate concentrate to dryness in vacuo at a temperature not exceeding 45° C., dissolving 760 mg. in 1.5 ml. n-butanol and placing on a column 2.5 cm. x 100 cm. containing 116 gm. Sephadex LH–20 in 190 ml. n-butanol. The column is eluted with n-butanol, collecting 4.5 ml. per fraction. Antibiotic components B and C are recovered as a mixture in approximate fractions 20 to 165, being excluded prior to component A. 540 ml. containing component A are collected in approximate fractions 255 to 375 and reduced to 10 ml. in vacuo at a temperature not exceeding 45° C. This fraction is subjected to countercurrent distribution in a 10/10 thirty transfer Craig apparatus (H. O. Post) using 10 ml. water-saturated n-butanol and 10 ml. n-butanol-saturated water per tube. Component A was recovered from the upper-layer tubes 16 through 29. These tubes were pooled, centrifuged at 7,000–8,000 × $g$ for 20 minutes at 4° C. to break the emulsion and the water discarded. The resultant 170 ml. n-butanol were evaporated to dryness in vacuo at a temperature not exceeding 45° C., producing a translucent viscous yellow-orange product. One half ml. methanol added to this material resulted in a colored solution and an insoluble inactive-fraction. The methanolic solution comprised component A essentially free from any other organic material, resulting in an overall purification of 1200-fold from the fermentation broth.

The antibiotics A, B, and C can be administered topically, orally or parenterally to a mammalian host, for example, monkeys, dogs, cats, guinea pigs, which have been afflicted with the afore-mentioned fungi. Typically, a dosage regimen of 1–100 mg./kg. body weight is administered.

Among the dosage forms which can be used for oral or parenteral administration are, for example, tablets, capsules, injections, which are well known to the pharmacist's art.

Among the dosage forms which can be used for topical applications are, for example, powders, ointments, and creams. In these dosage forms, the active ingredients from about 0.1% to 50% by weight are blended together with the selected vehicle such as white petrolatum and applied to sites afflicted with the susceptible organisms. The methods for the compounding of these topical applications are well known to the pharmacist's art.

We claim:
1. A method for the production of an antibiotic substance, which comprises incubating *Polyangium cellulosum* var. *fulvum* (SMP–78) ATCC 25532 in a medium comprising about 0.3% assimilable carbon sources and about 0.1% assimiliable nitrogen sources and an assimilable source of inorganic salts at a temperature from about 28° to about 37° C. until sufficient anti-fungal activity is produced.
2. A method according to claim 1 wherein said method is effected under submerged conditions accompanied with agitation and aeration.
3. A method according to claim 1 wherein said assimilable carbon source is cellobiose, maltose, dextrin or soluble starch.
4. A method according to claim 1 wherein said assimilable nitrogen source is ammonium nitrate, ammonium sulfate, ammonium acetate, ammonium chloride, ammonium carbonate or di-ammonium phosphate.
5. A method according to claim 1 wherein said inorganic salt is potassium, magnesium, calcium, iron or manganese salts.
6. An antibiotic substance produced by the process of claim 1.
7. A method for treating fungal infection in a mammalian host comprising administering to said host an antifungally effective amount of the antibiotic substance of claim 6.

References Cited
UNITED STATES PATENTS
3,534,138   10/1970   Ishida et al. _____ 424—121

JEROME D. GOLDBERG, Primary Examiner

U.S. Cl. X.R.
424—124; 195—81